US009718471B2

(12) United States Patent
Gordon et al.

(10) Patent No.: US 9,718,471 B2
(45) Date of Patent: Aug. 1, 2017

(54) AUTOMATED SPATIAL SEPARATION OF SELF-DRIVING VEHICLES FROM MANUALLY OPERATED VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 14/829,198

(22) Filed: Aug. 18, 2015

(65) Prior Publication Data
US 2017/0050638 A1   Feb. 23, 2017

(51) Int. Cl.
*B60W 30/16* (2012.01)
*B60K 35/00* (2006.01)
(Continued)

(52) U.S. Cl.
CPC ............. *B60W 30/16* (2013.01); *B60K 35/00* (2013.01); *G05D 1/0088* (2013.01); *G08G 1/22* (2013.01)

(58) Field of Classification Search
CPC ..... B60W 30/16; B60K 35/00; G05D 1/0088; G08G 1/22
See application file for complete search history.

(56) References Cited

U.S. PATENT DOCUMENTS

| 4,908,988 A | 3/1990 | Yamamura et al. |
| 5,975,791 A | 11/1999 | McCulloch |
(Continued)

FOREIGN PATENT DOCUMENTS

| CN | 1135063 | 11/1996 |
| CN | 2349068 Y | 11/1999 |
(Continued)

OTHER PUBLICATIONS

U.S. Appl. No. 14/887,388, filed Oct. 20, 2015.
(Continued)

*Primary Examiner* — Khoi Tran
*Assistant Examiner* — Robert Nguyen
(74) *Attorney, Agent, or Firm* — Law Office of Jim Boice

(57) ABSTRACT

A computer-implemented method, system, and/or computer program product automatically provide spatial separation between self-driving vehicles (SDVs) operating in an autonomous mode and vehicles being operating in a manual mode on a roadway. A first SDV operating on the roadway is operating in autonomous mode. A second vehicle may be operating in the autonomous mode or a manual mode, in which a driver is controlling the second vehicle. Processor(s) issue spatial separation instructions to the first SDV, which direct SDV control mechanisms controller on the first SDV to direct a set of SDV vehicular physical control mechanisms on the first SDV to provide a predetermined amount of spatial separation between the first SDV and the second vehicle, based on whether the second vehicle is being operated in the manual mode or in the autonomous mode.

20 Claims, 8 Drawing Sheets

(51) Int. Cl.
    *G05D 1/00*     (2006.01)
    *G08G 1/00*     (2006.01)

(56)     References Cited

U.S. PATENT DOCUMENTS

| | | | |
|---|---|---|---|
| 6,064,970 | A | 5/2000 | McMillian et al. |
| 6,201,318 | B1 | 3/2001 | Guillory |
| 6,326,903 | B1 | 12/2001 | Gross et al. |
| 6,393,362 | B1 | 5/2002 | Burns |
| 6,502,035 | B2 | 12/2002 | Levine |
| 6,587,043 | B1 | 7/2003 | Kramer |
| 6,622,082 | B1 | 9/2003 | Schmidt et al. |
| 6,731,202 | B1 | 5/2004 | Klaus |
| 6,810,312 | B2 | 10/2004 | Jammu et al. |
| 7,124,088 | B2 | 10/2006 | Bauer et al. |
| 7,580,782 | B2 | 8/2009 | Breed et al. |
| 7,769,544 | B2 | 8/2010 | Blesener et al. |
| 7,877,269 | B2 | 1/2011 | Bauer et al. |
| 7,894,951 | B2 | 2/2011 | Norris et al. |
| 7,979,173 | B2 | 7/2011 | Breed |
| 8,031,062 | B2 | 10/2011 | Smith |
| 8,045,455 | B1 | 10/2011 | Agronow et al. |
| 8,078,349 | B1 | 12/2011 | Gomez et al. |
| 8,090,598 | B2 | 1/2012 | Bauer et al. |
| 8,139,109 | B2 | 3/2012 | Schmiedel et al. |
| 8,140,358 | B1 | 3/2012 | Ling et al. |
| 8,146,703 | B2 | 4/2012 | Baumann et al. |
| 8,152,325 | B2 | 4/2012 | McDermott |
| 8,190,322 | B2 | 5/2012 | Lin et al. |
| 8,346,480 | B2 | 1/2013 | Trepagnier et al. |
| 8,352,112 | B2 | 1/2013 | Mudalige |
| 8,442,854 | B2 | 5/2013 | Lawton et al. |
| 8,466,807 | B2 | 6/2013 | Mudalige |
| 8,489,434 | B1 | 7/2013 | Otis et al. |
| 8,509,982 | B2 | 8/2013 | Montemerlo et al. |
| 8,583,365 | B2 | 11/2013 | Jang et al. |
| 8,660,734 | B2 | 2/2014 | Zhu et al. |
| 8,676,466 | B2 | 3/2014 | Mudalige |
| 8,786,461 | B1 | 7/2014 | Daudelin |
| 8,793,046 | B2 | 7/2014 | Lombrozo et al. |
| 8,816,857 | B2 | 8/2014 | Nordin et al. |
| 8,874,305 | B2 | 10/2014 | Dolgov et al. |
| 8,880,270 | B1 | 11/2014 | Ferguson et al. |
| 8,903,591 | B1 | 12/2014 | Ferguson et al. |
| 8,924,150 | B2 | 12/2014 | Tsimhoni et al. |
| 8,948,955 | B2 | 2/2015 | Zhu et al. |
| 8,949,016 | B1 | 2/2015 | Ferguson et al. |
| 8,954,217 | B1 | 2/2015 | Montemerlo et al. |
| 8,954,252 | B1 | 2/2015 | Urmson et al. |
| 8,954,261 | B2 | 2/2015 | Das et al. |
| 8,958,943 | B2 | 2/2015 | Bertosa et al. |
| 8,965,621 | B1 | 2/2015 | Urmson et al. |
| 8,970,362 | B2 | 3/2015 | Morley et al. |
| 8,983,705 | B2 | 3/2015 | Zhu et al. |
| 8,996,224 | B1 | 3/2015 | Herbach et al. |
| 9,014,905 | B1 | 4/2015 | Kretzschmar et al. |
| 9,020,697 | B2 | 4/2015 | Ricci et al. |
| 9,024,787 | B2 | 5/2015 | Alshinnawi et al. |
| 9,082,239 | B2 | 7/2015 | Ricci |
| 9,123,049 | B2 | 9/2015 | Hyde et al. |
| 9,170,327 | B2 | 10/2015 | Choe et al. |
| 9,189,897 | B1 | 11/2015 | Stenneth |
| 9,194,168 | B1 | 11/2015 | Lu et al. |
| 9,216,745 | B2 | 12/2015 | Beardsley et al. |
| 9,286,520 | B1 | 3/2016 | Lo et al. |
| 9,305,411 | B2 | 4/2016 | Ricci |
| 9,317,033 | B2 | 4/2016 | Ibanez-guzman et al. |
| 9,390,451 | B1 | 7/2016 | Slusar |
| 9,399,472 | B2 | 7/2016 | Minoiu-Enache |
| 9,463,805 | B2 | 10/2016 | Kirsch et al. |
| 9,483,948 | B1 | 11/2016 | Gordon et al. |
| 2002/0026841 | A1 | 3/2002 | Svendsen |
| 2003/0065572 | A1 | 4/2003 | McNee et al. |
| 2003/0076981 | A1 | 4/2003 | Smith et al. |
| 2004/0078133 | A1* | 4/2004 | Miller ............... B60K 31/0008 701/96 |
| 2004/0199306 | A1 | 10/2004 | Heilmann et al. |
| 2005/0104745 | A1 | 5/2005 | Bachelder et al. |
| 2006/0106671 | A1 | 5/2006 | Biet |
| 2006/0163939 | A1 | 7/2006 | Yuramochi et al. |
| 2006/0200379 | A1 | 9/2006 | Biet |
| 2006/0241855 | A1 | 10/2006 | Joe et al. |
| 2007/0100687 | A1 | 5/2007 | Yoshikawa |
| 2007/0124027 | A1 | 5/2007 | Betzitza et al. |
| 2008/0048850 | A1 | 2/2008 | Yamada |
| 2008/0114663 | A1 | 5/2008 | Watkins et al. |
| 2008/0129475 | A1 | 6/2008 | Breed et al. |
| 2008/0201217 | A1 | 8/2008 | Bader et al. |
| 2009/0094109 | A1 | 4/2009 | Aaronson et al. |
| 2009/0248231 | A1 | 10/2009 | Kamiya |
| 2009/0313096 | A1 | 12/2009 | Kama |
| 2010/0057511 | A1 | 3/2010 | Mansouri et al. |
| 2010/0156672 | A1 | 6/2010 | Yoo et al. |
| 2010/0179720 | A1 | 7/2010 | Lin et al. |
| 2010/0228427 | A1 | 9/2010 | Anderson et al. |
| 2010/0256852 | A1* | 10/2010 | Mudalige ............... G08G 1/163 701/24 |
| 2011/0035250 | A1 | 2/2011 | Finucan |
| 2011/0077807 | A1 | 3/2011 | Hyde et al. |
| 2011/0137699 | A1 | 6/2011 | Ben-Ari et al. |
| 2011/0264521 | A1 | 10/2011 | Straka |
| 2012/0277947 | A1 | 11/2012 | Boehringer et al. |
| 2013/0030657 | A1 | 1/2013 | Chatterjee et al. |
| 2013/0113634 | A1 | 5/2013 | Hutchinson et al. |
| 2013/0131949 | A1* | 5/2013 | Shida ................ B60T 7/00 701/96 |
| 2013/0144502 | A1* | 6/2013 | Shida ................ B60K 31/0008 701/96 |
| 2013/0231824 | A1 | 9/2013 | Wilson et al. |
| 2013/0261871 | A1 | 10/2013 | Hobbs et al. |
| 2014/0019259 | A1 | 1/2014 | Dung et al. |
| 2014/0092332 | A1 | 4/2014 | Price |
| 2014/0095214 | A1 | 4/2014 | Mathe et al. |
| 2014/0129073 | A1 | 5/2014 | Ferguson |
| 2014/0136045 | A1 | 5/2014 | Zhu et al. |
| 2014/0136414 | A1 | 5/2014 | Abhyanker |
| 2014/0164126 | A1 | 6/2014 | Nicholas et al. |
| 2014/0188999 | A1 | 7/2014 | Leonard et al. |
| 2014/0195213 | A1* | 7/2014 | Kozloski ............... G06F 17/5009 703/8 |
| 2014/0201037 | A1 | 7/2014 | Mallawarachchi et al. |
| 2014/0201126 | A1 | 7/2014 | Zadeh |
| 2014/0214255 | A1 | 7/2014 | Dolgov et al. |
| 2014/0222277 | A1 | 8/2014 | Tsimhoni et al. |
| 2014/0222577 | A1 | 8/2014 | Abhyanker |
| 2014/0282967 | A1 | 9/2014 | Maguire |
| 2014/0297116 | A1 | 10/2014 | Anderson et al. |
| 2014/0306833 | A1 | 10/2014 | Ricci |
| 2014/0309789 | A1 | 10/2014 | Ricci |
| 2014/0309806 | A1 | 10/2014 | Ricci |
| 2014/0309864 | A1 | 10/2014 | Ricci |
| 2014/0309891 | A1 | 10/2014 | Ricci |
| 2014/0310186 | A1 | 10/2014 | Ricci |
| 2014/0316671 | A1* | 10/2014 | Okamoto ............... G08G 1/22 701/96 |
| 2014/0324268 | A1 | 10/2014 | Montemerlo et al. |
| 2014/0330479 | A1* | 11/2014 | Dolgov ............... B60W 30/16 701/28 |
| 2014/0358331 | A1 | 12/2014 | Prada Gomez et al. |
| 2014/0358353 | A1 | 12/2014 | Ibanez-Guzman et al. |
| 2015/0006005 | A1 | 1/2015 | Yu et al. |
| 2015/0006014 | A1 | 1/2015 | Wimmer et al. |
| 2015/0026092 | A1 | 1/2015 | Abboud et al. |
| 2015/0035685 | A1 | 2/2015 | Strickland et al. |
| 2015/0051778 | A1 | 2/2015 | Mueller |
| 2015/0057891 | A1 | 2/2015 | Mudalige et al. |
| 2015/0062340 | A1 | 3/2015 | Datta et al. |
| 2015/0062469 | A1 | 3/2015 | Fleury |
| 2015/0066282 | A1 | 3/2015 | Yopp |
| 2015/0066284 | A1 | 3/2015 | Yopp |
| 2015/0070178 | A1 | 3/2015 | Kline |
| 2015/0095190 | A1 | 4/2015 | Hammad et al. |
| 2015/0134178 | A1 | 5/2015 | Minoiu-Enache |
| 2015/0141043 | A1 | 5/2015 | Abramson |
| 2015/0149021 | A1 | 5/2015 | Duncan et al. |

(56) References Cited

U.S. PATENT DOCUMENTS

| | | |
|---|---|---|
| 2015/0160019 A1 | 6/2015 | Biswal et al. |
| 2015/0166059 A1 | 6/2015 | Ko |
| 2015/0175070 A1 | 6/2015 | Attard et al. |
| 2015/0178998 A1 | 6/2015 | Attard et al. |
| 2015/0196256 A1 | 7/2015 | Venkatraman et al. |
| 2015/0232065 A1 | 8/2015 | Ricci et al. |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0303969 A1 | 10/2016 | Akula |
| 2016/0334797 A1 | 11/2016 | Ross et al. |
| 2016/0344737 A1 | 11/2016 | Anton |
| 2016/0355192 A1 | 12/2016 | James et al. |
| 2016/0364823 A1 | 12/2016 | Cao |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

Anonymous, "Self-Driving Cars and Insurance", Insurance Information Institute, Inc., Feb. 2015, pp. 1-3.
E. Lehrer, "The Insurance Implications of Google's Self-Driving Car", Insurance Journal, Right Street BLOH=G, May 28, 2014, pp. 1-2.
Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.
Smith, Mark. "Inovations: Emerging Trends in the Wheelchair Market." New Mobility Magazine, Aug. 1, 2014. Web. <http://www.newmobility.com/2014/08/emerging-trends/>.
Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.
Anonymous, 'System and Method to Target Advertisements for the Right Focus Group'. ip.com, No. 000218285, May 31, 2012, pp. 1-2.
Anonymous, "Car Built-In Mechanism to Enforce Mandatory Self-Driving Mode", ip.com, No. 000234916, Feb. 14, 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
A. Abkowitz, "Do Self-Driving Cars Spell Doom for Auto Insurers?", Bloomberg L.P., Sep. 10, 2014, pp. 1-2.
Chen S, et al., A Crash Risk Assessment Model for Roas Curves. InProceedings 20th International Technical Conference on the Enhanced Saftey of Vehicles., 2007. Lyon, France.
Anonymous, "Diagnostics Mechanism for Self-Driving Cars to Validate Self-Driving Capabilities", ip.com, Jun. 6, 2014, pp. 1-5. ip.com.
P. Mell et al., "The NIST Definition of Cloud Computing", National Institute of Standards and Technology, Information Technology Laboratory, Sep. 2011, pp. 1-7.
M. Fox, "Self-driving cars safer than those driven by humans: Bob Lutz", CNBC, www.cnbc.com, Sep. 8, 2014, 1 page.
X. Jardin, "Terrifying dashcam video captures distracted teen drivers crashing while goofing off", Boing Boing, www.boingboing.net, Mar. 26, 2015, 1 page.
T. Vanderbilt, "Let the Robot Drive: The Autonomous Car of the Future Is Here", Wired Magazine, Conde Nast, www.wired.com, Jan. 20, 2012, pp. 1-34.
Brownell, "Shared Autonomous Taxi Networks: An Analysis of Transportation Demand in NJ and a 21st Century Solution for Congestion", Dissertation, Princeton University, 2013, pp. 1-122.
Bessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.
Lutin et al., "The Revolutionary Development of Self-Driving Vehicles and Implications for the Transportation Engineering Profession", ITE Journal 83.7, 2013, pp. 28-32.
A. Hars, "Self-Driving Cars: The Digital Transformation of Mobility", Marktplatze Im Umbruch, Springer Berlin Heidelberg, 2015, pp. 539-549.
Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.
Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.
C. Berger et al., "COTS—Architecture With a Real-Time OS for a Self-Driving Miniature Vehicle", Safecomp 2013—Workshop ASCOMS of the 32nd International Conference on Computer Safety, Reliability and Security, Sep. 2013, Toulouse, France, pp. 1-13.
U.S. Appl. No. 14/855,731 Non-Final Office Action Mailed Apr. 15, 2016.

\* cited by examiner

AUTOMATED SPATIAL SEPARATION OF SELF-DRIVING VEHICLES FROM MANUALLY OPERATED VEHICLES

BACKGROUND

The present disclosure relates to the field of vehicles, and specifically to the field of self-driving vehicles. Still more specifically, the present disclosure relates to the field of automatically providing spatial separation of self-driving vehicles from vehicles that are currently being operated in manual mode.

Self-driving vehicles (SDVs) are vehicles that are able to autonomously drive themselves through private and/or public spaces. Using a system of sensors that detect the location and/or surroundings of the SDV, logic within or associated with the SDV controls the propulsion, stopping, and steering of the SDV based on the sensor-detected location and surroundings of the SDV.

SUMMARY

A computer-implemented method, system, and/or computer program product automatically provide spatial separation between self-driving vehicles (SDVs) operating in an autonomous mode and vehicles being operating in a manual mode on a roadway. One or more processors interrogate a driving mode module on a first SDV operating on the roadway. The first SDV is capable of being operated in autonomous mode by a first SDV control mechanisms controller being controlled by a first SDV on-board computer on the first SDV. The first SDV control mechanisms controller controls a first set of SDV vehicular physical control mechanisms on the first SDV. The driving mode module selectively controls whether the first SDV is operated in the autonomous mode or in manual mode, where the first SDV is controlled by a first human driver of the first SDV if the first SDV is in the manual mode. The processor(s) determine, based on a response from the driving mode module, that the first SDV is operating in the autonomous mode. The processors(s) receive a control mode signal from a second vehicle operating on the roadway. The control mode signal describes whether a second set of SDV vehicular physical control mechanisms on the second vehicle is being operated in the manual mode by a second human driver of the second vehicle or in the autonomous mode by a second SDV control mechanisms controller being controlled by a second SDV on-board computer on the second vehicle. The processor(s) issue spatial separation instructions to the first SDV. The spatial separation instructions direct the first SDV control mechanisms controller to direct the first set of SDV vehicular physical control mechanisms on the first SDV to provide a predetermined amount of spatial separation between the first SDV and the second vehicle based on whether the second vehicle is being operated in the manual mode or in the autonomous mode.

DETAILED DESCRIPTION

Figure 1:
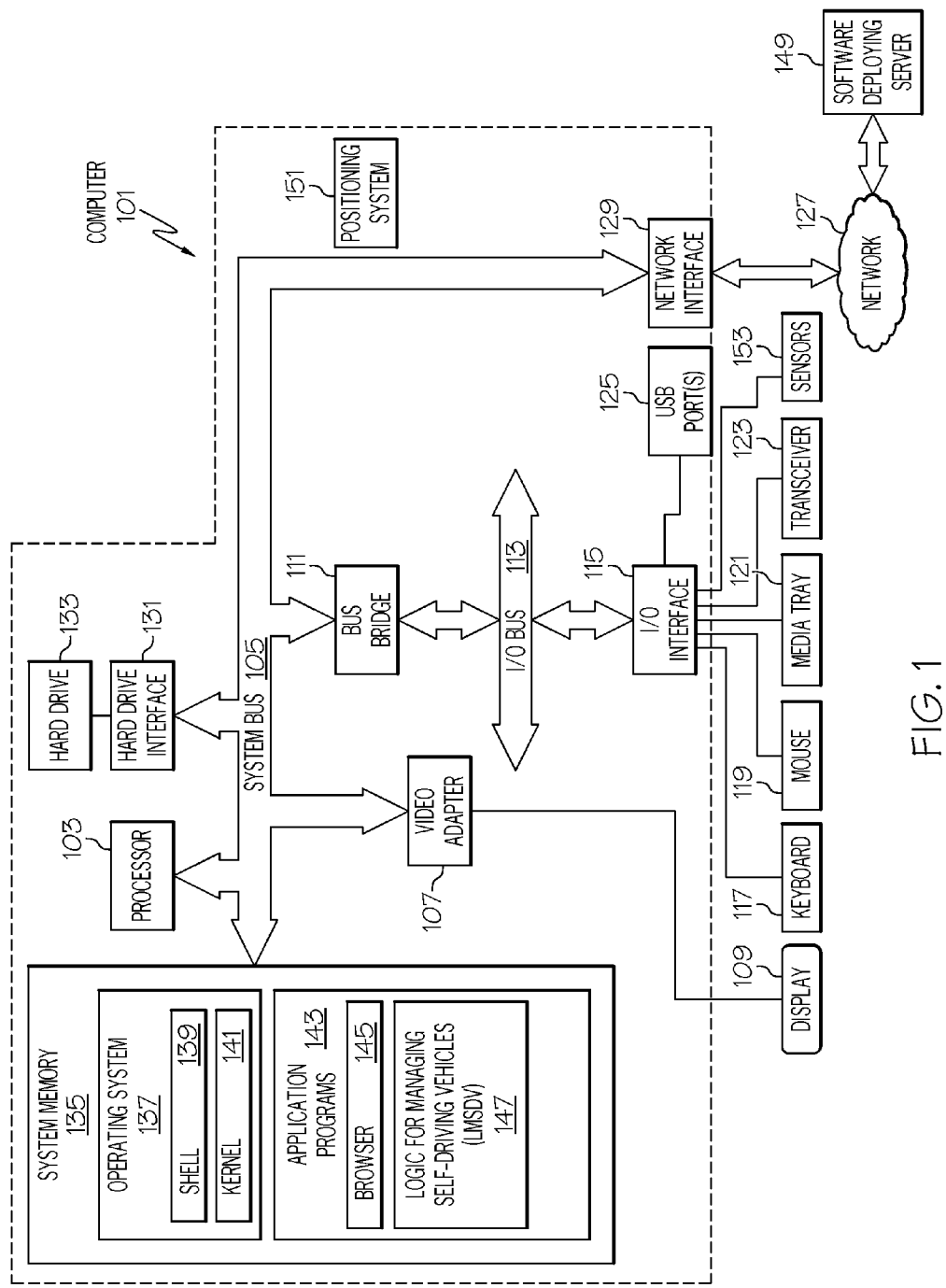
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Given their communication and response times that far exceed those of human drivers, SDVs operating in autonomous mode are able to drive more closely together, even at high speeds. Thus, if SDVs and human cars are segregated, the SDVs will all be able to drive together more densely than they could if they had to co-mingle with human driven cars (each of which still requires human-based separations from surrounding cars).

Therefore, one or more embodiments of the present invention described herein present a system and method that provides spatial separation between self-driving vehicles (SDVs) operating in autonomous mode and other vehicles operating in manual mode (in which a human driver is physically controlling the vehicle, which may or may not have autonomous control hardware found in an SDV). In one embodiment of the present invention, special road lanes and road ramps are marked in real time for SDV and non-SDV use only (see FIG. 2 below).

In one or more embodiments of the present invention, the system takes into consideration the concentration of SDVs within a certain area. Based on this determination, the spatial separation is adjusted in order to solve the problem of SDV/manual vehicles merging in an unsafe/inefficient manner by segregating vehicles operating in the autonomous/manual mode to certain roads, lanes, and ramps. This segregation may be accomplished by interfaces into the vehicle navigation systems or by (dynamic) modification of roadside (digital) signage.

Thus, in one embodiment of the present invention, vehicles on a roadway communicate their location and driving mode to a central data processing center. Based on the likelihood of a merger between human operated vehicles (in manual mode) and self-driving vehicles (in autonomous mode), an amelioration action is taken. In accordance with various embodiments of the present invention, this amelioration action is (1) a direct communication to vehicles to speed up or slow down; (2) a change to a road signage to indicate SDV versus non-SDV use only on certain lanes; (3) an instruction to control whether vehicles operate in SDV (autonomous) mode or non-SDV (manual) mode; and/or (4) instruction to dynamically change SDV/non-SDV use of each lane on a roadway, a duration of such states of each lane on the roadway, and/or segments of each such lane on the roadway, thereby minimizing congestion on the roadway and increasing a balanced utility of all lanes on the roadway.

In one embodiment of the present invention, environmental factors such as snow/ice on the roadway, construction on the roadway, accidents on the roadway, etc. are taken into account when determining the SDV/non-SDV usage of lanes. In case of an accident or immobilized vehicles on a specific lane on the roadway, an SDV vehicle is directed to avoid such accidents or immobilized vehicles by entering another lane on the roadway. During such lane changes, all nearby vehicles are notified immediately of such an incident, and/or a lane previously reserved for exclusive use by SDV or non-SDV vehicles is adjusted to become a hybrid-use lane (used by both SDVs and non-SDVs).

In one embodiment of the present invention, a driver profile of a vehicle capable of autonomous control provides an indication of the driver's driving abilities. Based on these predefined driving abilities, and/or any distractions within the vehicle, control may be automatically switched from manual mode to autonomous mode.

In one embodiment of the present invention, active learning is employed so that the system as a whole learns from the experiences of many SDVs and drivers, in different geographies and among cohorts. Geographies may include cities, rural areas, and the like. Cohorts may include both cohorts of people with certain characteristics related to their driving ability, as well as cohorts of vehicles with certain handling characteristics, as described in further detail below.

In one embodiment of the present invention, the present invention allows the mixing of SDVs operating in autonomous mode with vehicles being operated in manual mode in an ad hoc manner, thus increasing the efficiency of vehicles operating in either or both modes, especially at merge points.

However, when vehicles are coordinated through a coordinating server rather than an ad hoc communication between vehicles, control over the process of coordinating movement of the vehicles is optimized, thus resulting in a smoother laminar flow of vehicular traffic, since better look-ahead information is available to the coordinating server.

Furthermore, by segregating SDV (in autonomous mode) from non-SDV (operating in manual mode) vehicles at choke points (e.g., on and off ramps completely), higher speeds and safer usage are provided to SDVs as well as non-SDVs.

In one or more embodiments of the present invention, the segregation of SDVs from non-SDVs is determined dynamically based on how many SDVs there actually are at a given time and place. Thus, as SDVs become more prevalent, roads equipped with the current invention are able to automatically offer the right degree of spatial separation without the need to physically modify the given roads.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating server 201 depicted in FIG. 2, and/or self-driving vehicle (SDV) on-board computer 301 shown in FIG. 3, and/or coordinating server 201 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
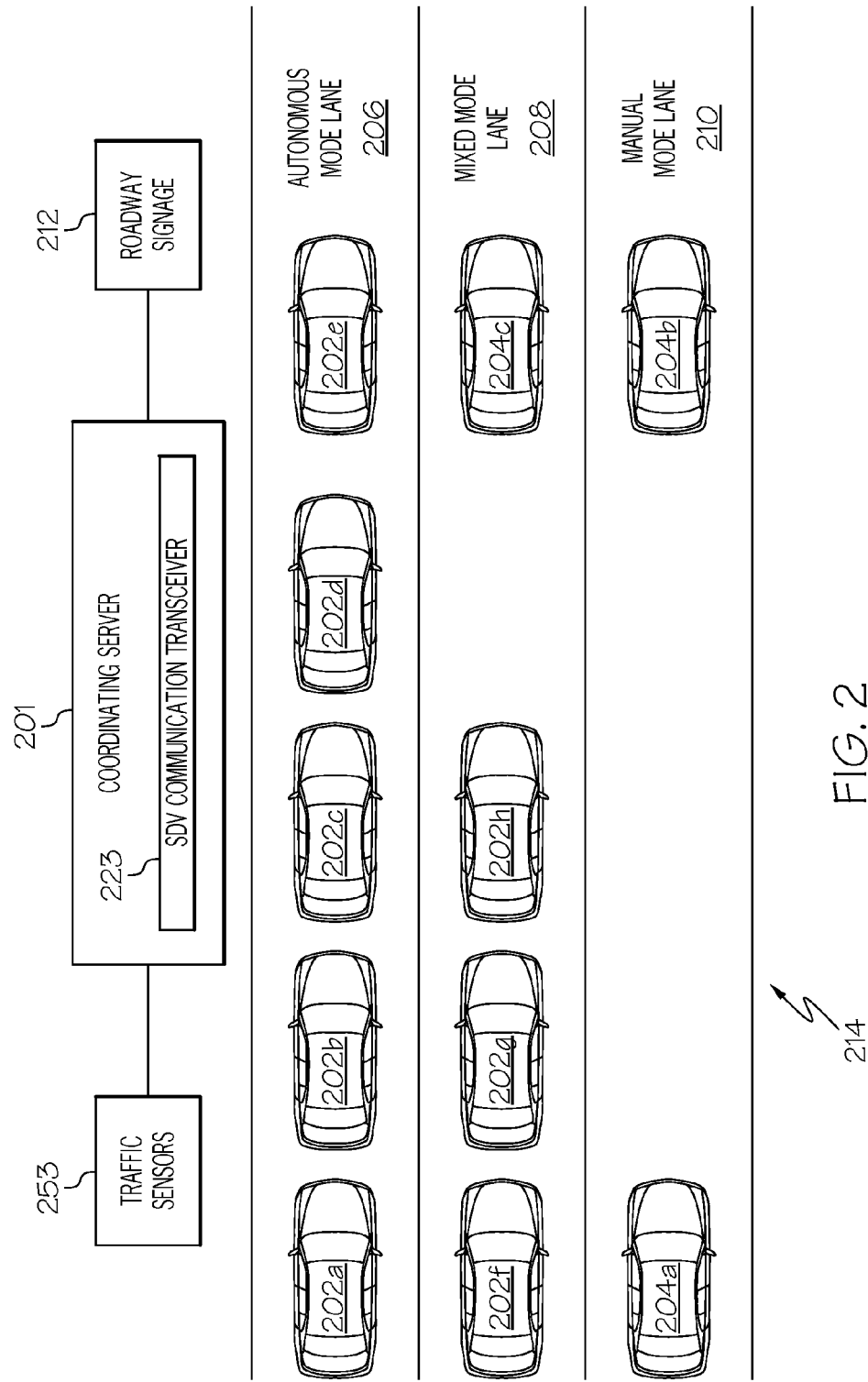
FIG. 2 illustrates exemplary self-driving vehicles (SDVs) operating on a roadway.

As depicted, computer 101 is able to communicate with a software deploying server 149 and/or other devices/systems (e.g., coordinating server 201, one or more of the SDVs 202a-202h, one or more of the vehicles 204a-204c shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

Also associated with computer 101 are sensors 153, which detect an environment of the computer 101. More specifically, sensors 153 are able to detect vehicles, road obstructions, toll booths, etc. For example, if computer 101 is on board a self-driving vehicle (SDV), then sensors 153 may be cameras, radar transceivers, etc. that allow the SDV to detect the environment (e.g., other vehicles, road obstructions, a toll booth, etc.) of that SDV. Similarly, if hardware within computer 101 is used by coordinating server 201 shown in FIG. 2, then sensors 153 may be cameras, radar transceivers, radio frequency identifier (RFID) transceivers, etc. that allow the coordinating server 201 to identify oncoming and/or passing-by vehicles, including SDVs.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, exemplary self-driving vehicles (SDVs) 202a-202h (where "h" is an integer) and vehicles 204a-204c (where "c" is also an integer) traveling along a roadway 214 in accordance with one or more embodiments of the present invention is presented. For purposes of illustration, assume that all of the SDVs 202a-202h are being operated in a self-driving (i.e., autonomous) mode. Assume further that while vehicles 204a-204c may or may not have hardware required to enable vehicles 204a-204c to operate in self-driving (autonomous) mode, initially vehicles 204a-204c are being operated in manual mode, in which they are controlled by manual inputs that are provided by a human driver.

Figure 3:
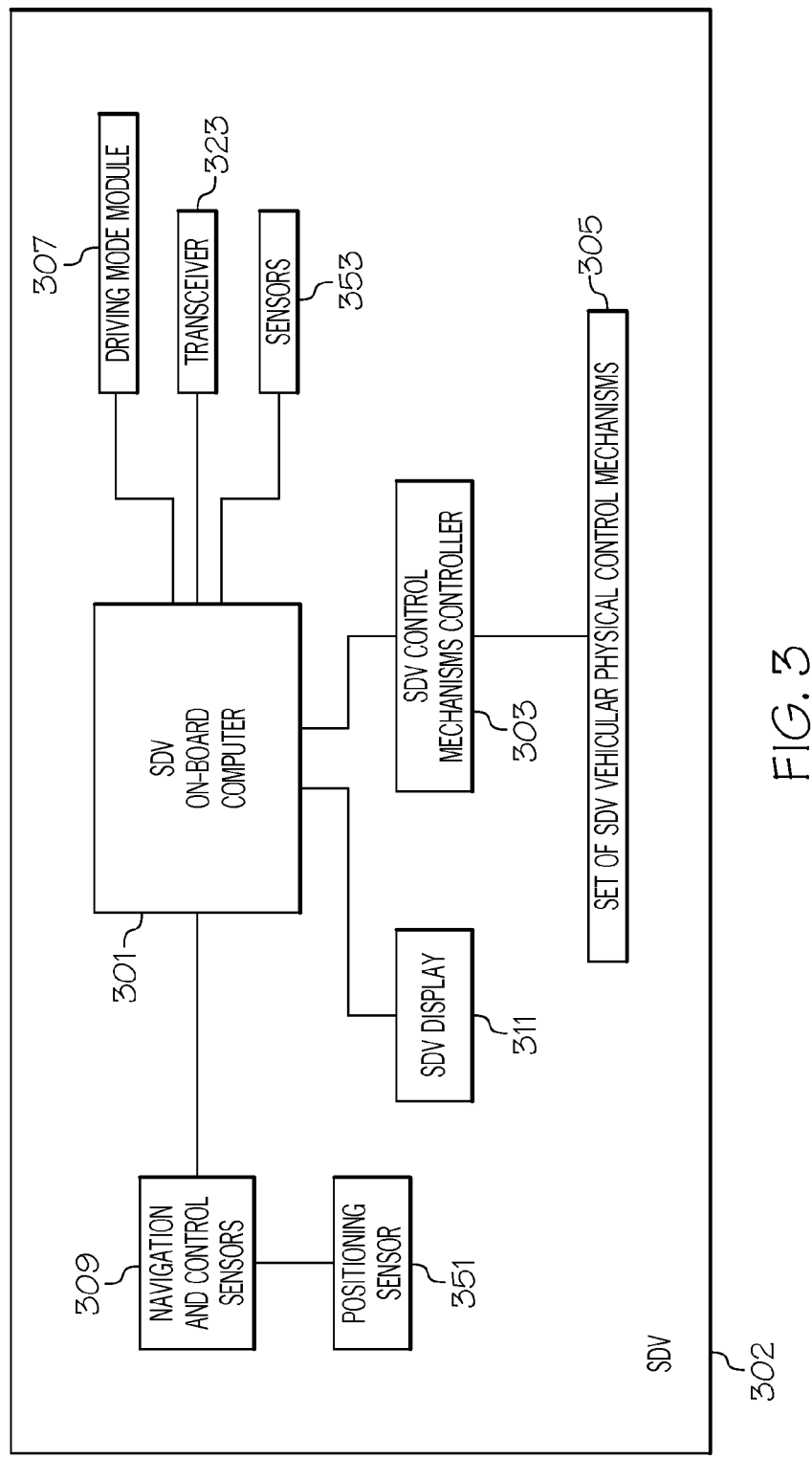
FIG. 3 depicts additional detail of control hardware within an SDV.

Additional detail of one or more embodiments of one or more of the SDVs 202a-202h and/or vehicles 204a-204c shown in FIG. 2 is presented in FIG. 3 as SDV 302. As shown in FIG. 3, SDV 302 has an SDV on-board computer 301 that controls operations of the SDV 302. According to directives from a driving mode module 307, SDV 302 can be selectively operated in manual mode or autonomous mode.

While in manual mode, SDV 302 operates as a traditional motor vehicle, in which a human driver controls the engine, steering mechanism, braking system, horn, signals, etc. found on a motor vehicle. These vehicle mechanisms may be operated in a "drive-by-wire" manner, in which inputs to an SDV control mechanisms controller 303 by the driver result in output signals that control the SDV vehicular physical control mechanisms 305 (e.g., the engine throttle, steering mechanisms, braking systems, turn signals, etc.).

While in autonomous mode, SDV 302 operates without the input of a human driver, such that the engine, steering mechanism, braking system, horn, signals, etc. are still controlled by the SDV control mechanisms controller 303, but now under the control of the SDV on-board computer 301. That is, by processing inputs taken from navigation and control sensors 309 (which may use inputs from a positioning sensor 351, analogous to positioning sensor 151 shown in FIG. 1, to indicate the current position of the SDV 302) and the driving mode module 307 indicating that the SDV 202 is to be controlled autonomously, then driver inputs are no longer needed.

As just mentioned, the SDV on-board computer 301 uses outputs from navigation and control sensors 309 to control the SDV 302. Navigation and control sensors 309 include hardware sensors that (1) determine the location of the SDV 302; (2) sense other cars and/or obstacles and/or physical structures around SDV 302; (3) measure the speed and direction of the SDV 302; and (4) provide any other inputs needed to safely control the movement of the SDV 302.

With respect to the feature of (1) determining the location of the SDV 302, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 302. Positioning system 151 may also use, either alone or in conjunction with a GPS system, physical movement sensors such as accelerometers (which measure rates of changes to a vehicle in any direction), speedometers (which measure the instantaneous speed of a vehicle), air-flow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of (2) sensing other cars and/or obstacles and/or physical structures around SDV 302, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 302 to objects being interrogated by the electromagnetic radiation) in the received electromagnetic radiation from when it was transmitted, the presence and location of other physical objects can be ascertained by the SDV on-board computer 301.

With respect to the feature of (3) measuring the speed and direction of the SDV 302, this can be accomplished by taking readings from an on-board speedometer (not depicted) on the SDV 302 and/or detecting movements to the steering mechanism (also not depicted) on the SDV 302 and/or the positioning system 151 discussed above.

With respect to the feature of (4) providing any other inputs needed to safely control the movement of the SDV 302, such inputs include, but are not limited to, control signals to activate a horn, turning indicators, flashing emergency lights, etc. on the SDV 302.

Returning now to FIG. 2, assume that a roadway 214 has multiple lanes. Initially, an autonomous mode lane 206 is reserved for SDVs such as SDVs 202a-202e that are operating in the self-driving (autonomous) mode described above. Manual mode lane 210 is reserved for vehicles (depicted as vehicles 204a-204b, which may or may not have the hardware depicted in FIG. 3 required to operate in autonomous mode) that are operating in manual mode. Use of mixed mode lane 208 is permitted by both autonomous vehicles (depicted as SDVs 202f-202h) and manual-mode vehicles (depicted as vehicle 204c).

As mentioned above, in one embodiment of the present invention, vehicles on roadway 214 communicate their location and driving mode to a central data processing center, shown in FIG. 2 as coordinating server 201. Based on the likelihood of a merger between human operated vehicles (e.g., vehicles 204a-204c being operated in manual mode) and self-driving vehicles (e.g., SDVs 202a-202h being operated in autonomous mode), an amelioration action is taken. In accordance with various embodiments of the present invention, this amelioration action is (1) a direct communication to vehicles to speed up or slow down; (2) a change to a road signage to indicate SDV versus non-SDV use only on certain lanes; (3) controlling whether vehicles operate in SDV (autonomous) mode or non-SDV (manual) mode; and/or (4) dynamically changing the SDV/non-SDV use of each lane, duration of such states of each lane, and/or segments of each such lane, thereby minimizing congestion on the roadway and increasing a balanced utility of all lanes on the roadway (e.g., by forcing vehicles to change lanes on the roadway).

For example, amelioration action (1) occurs when the SDV communication transceiver 223 sends a signal to one or more of the SDVs 202a-202h to speed up or slow down. For example, assume that vehicle 204c has just moved into mixed mode lane 208, and that SDV 202h (while in autonomous mode) initially was too close to vehicle 204c. Thus, SDV communication transceiver 223 will instructs SDV 202h to slow down, such that more space is allowed behind vehicle 204c. Note that SDVs 202f-202g must also slow down. However, they are allowed to stay close together (e.g., closer together than SDV 202h and vehicle 204c), since in a preferred embodiment SDVs 202f-202h are coordinating their movement by communicating between the SDV on-board computers 301 (shown in FIG. 3) that reside on each of the SDVs 202f-202h. Thus, the SDVs 202f-202h never initiate any "unexpected" braking, steering, etc. However, the same cannot be said of vehicle 204c, which due to unpredictable actions taken by the driver of vehicle 204c (which is in manual control mode). Thus, the additional cushion of space is afforded vehicle 204c by SDV 202h. Similarly, if too much space is being afforded to vehicle 204c by SDVs 202f-202h, then the SDV on-board computers 301 that reside on each of the SDVs 202f-202h will cause the SDVs 202f-202h to accelerate, thus closing the gap between SDV 202h and vehicle 204c.

Amelioration action (2) occurs when a change to a road signage 212 is issued by coordinating server 201 to indicate SDV versus non-SDV use only on certain lanes. That is, the control mode (SDV/autonomous versus non-SDV/manual) is not fixed in one or more embodiments of the present invention. This allows the lanes 206-210 shown in FIG. 2 to be dynamically changed based on how many SDVs are on roadway 214, current weather conditions on roadway 214, traffic patterns, etc. For example, assume that one or more of the SDVs 202a-202h have received data (e.g., from coordinating server 201, from traffic sensors 253, from other SDVs from SDVs 202a-202h, from vehicles 204a-204c, etc. shown in FIG. 2) that there is a backup of traffic ahead of SDV 202h (even if not visible to the driver of SDV 202h). This information is utilized by the SDV on-board computer 301 within SDV 202h, such that the operation/movement of SDV 202h is autonomously and automatically adjusted (e.g., by switching lanes, by slowing down, by exiting roadway 214, by converting more manual mode lanes into autonomous mode lanes, by converting more autonomous mode lanes into manual mode lanes, etc.).

Amelioration action (3) occurs when coordinating server 201 controls whether vehicles operate in SDV (autonomous) mode or non-SDV (manual) mode. As described herein, one or more of vehicles 204a-204c may contain the requisite hardware to operate in autonomous mode. Thus, if one or more of vehicles 204a-204c are initially operating in manual mode, the coordinating server 201 can optionally direct them to switch to autonomous mode when necessary (e.g., to force one of the vehicles 204a-204c to move out of the autonomous mode lane 206 and/or the mixed mode lane 208 onto the manual mode lane 210).

Amelioration action (4) occurs when the coordinating server 201 dynamically changes of SDV/non-SDV use of each lane, duration of such states of each lane, and/or segments of each such lane, thereby minimizing congestion on the roadway and increasing a balanced utility of all lanes on the roadway. For example, coordinating server 201 may switch mixed mode lane 208 to a full autonomous mode lane (similar to autonomous mode lane 206) based on a high quantity (beyond some predefined number) of SDVs operating in autonomous mode in a certain area of roadway 214, during a certain time of day or day of the week, etc.

In a preferred embodiment of the present invention, the amelioration actions (1)-(4) are performed by coordinating server 201. However, in another embodiment of the present invention, amelioration actions (1)-(4) are performed by one of the SDVs 202a-202h (thus taking on one or more of the managerial functions of coordinating server 201), or by an ad hoc combination of two or more of the SDVs 202a-202h (which are communicating with one another using transceivers such as transceiver 323 shown in FIG. 3), thus providing an intelligent "Internet of things" that control the processes described herein.

In one embodiment of the present invention, one or more of the amelioration actions (1)-(4) described above are presented to an occupant/driver of the vehicle (e.g., SDV 302 shown in FIG. 3) on an SDV display 311 within the cabin of the SDV 302, thus alerting the occupant/driver of occurring amelioration actions.

While the present invention has been shown in FIG. 2 in the context of a roadway having multiple lanes that are limited to a certain mode (autonomous or manual) of operation for vehicles traveling thereon, in one embodiment the coordinating server 201 adjusts the mode of operation of vehicles according to other conditions, such as a construction zone (in which the mode of operation may be switched from autonomous to manual), hazardous overpasses (in which the mode of operation may be switched from manual to autonomous), presence of emergency vehicles, etc. For example, some states now have laws requiring vehicles to either slow down to a speed that is 10-20 miles per hour below the posted speed limit, or else to move over to a center lane (from an outer lane) on a roadway, when approaching an emergency vehicle (e.g., a police car, a fire engine, an ambulance) that is parked on a shoulder of the roadway. A presence signal may be transmitted from such an emergency vehicle to the SDV on-board computer 301 within an approaching SDV (e.g., one or more of SDVs 202a-202h) notifying the approaching SDV of the presence of the emergency vehicle, thereby causing the approaching SDV to slow down and/or move over to a lane that is away from the shoulder of the roadway.

Similarly, environmental factors such as snow/ice on the roadway, construction on the roadway, accidents on the roadway, etc. are taken into account when determining the SDV/non-SDV usage of lanes. That is, the coordinating server 201 may not only switch the control mode based on certain factors (e.g., snow, construction, etc. on roadway 214), but may also adjust roadway signage 212 and/or control signals being sent to SDV on-board computers 301 that allow an otherwise prohibited lane to be used (e.g., allowing autonomous mode lane 206 to be used by manual mode vehicle 204c).

In one embodiment of the present invention, a driver profile of a vehicle capable of autonomous control provides an indication of the driver's driving abilities. Based on these predefined driving abilities, and/or any distractions within the vehicle, control may be automatically switched from manual mode to autonomous mode.

For example, assume that coordinating server 201 has accessed a driver profile database for the driver of vehicle 204c from an SDV on-board computer 301 within vehicle 204c, and that this driver profile indicates that the driver's driving ability in snow is poor (e.g., this driver has a record of multiple accidents in snow conditions on roadways). As such, the coordinating server 201 may force the vehicle 204c to switch from manual mode to autonomous mode.

Similarly, if sensors within vehicle 204c indicate the presence of small children, pets, other passengers (e.g., using sensors 353 shown in FIG. 3 that pick up sounds, pressure on seats, etc.) within the cabin of vehicle 204c, which are likely distractions to the driver of the vehicle 204c, then the coordinating server 201 may force the vehicle 204c to switch from manual mode to autonomous mode.

As represented in FIG. 2, autonomous mode lane 206 is limited to SDVs 202a-202e that are in full autonomous control mode. As such, the spacing of SDVs 202a-202e to one another is able to be very close since they are (1) able to communicate their operational parameters to one another and/or (2) have much faster response times than human drivers. This allows roadway 214 to handle much more overall traffic, since the SDVs 202a-202e are more tightly spaced (compacted), thereby improving the overall laminar flow-rate of vehicles on roadway 214.

In one embodiment of the present invention, SDVs are allowed to enter autonomous mode lane 206 based not only on being in autonomous mode, but also on their abilities. For example, assume that coordinating server 201 only allows SDVs that have certain types of tires (e.g., rain tires), velocity ability (e.g., ability to travel in excess of 70 miles per hour), and braking abilities (e.g., four wheel disk brakes) to enter autonomous mode lane 206. If one or more of the SDVs 202a-202h do not meet these standards, they would cause the other SDVs from SDVs 202a-202h to slow down, provide additional spacing, etc., in order to accommodate for the lesser-abled SDV.

In one embodiment of the present invention, determining the type and/or condition of tires on SDVs is performed by image analysis. For example, assume that the sensors 353 on SDV 302 are on-board cameras aimed at the tires on SDV 302. The nature of the tread, inflation, etc. of the tires is determined by image analysis of images of the tires captured by these cameras, thereby determining one of the factors that determine the condition of the SDV 302.

Figure 4:
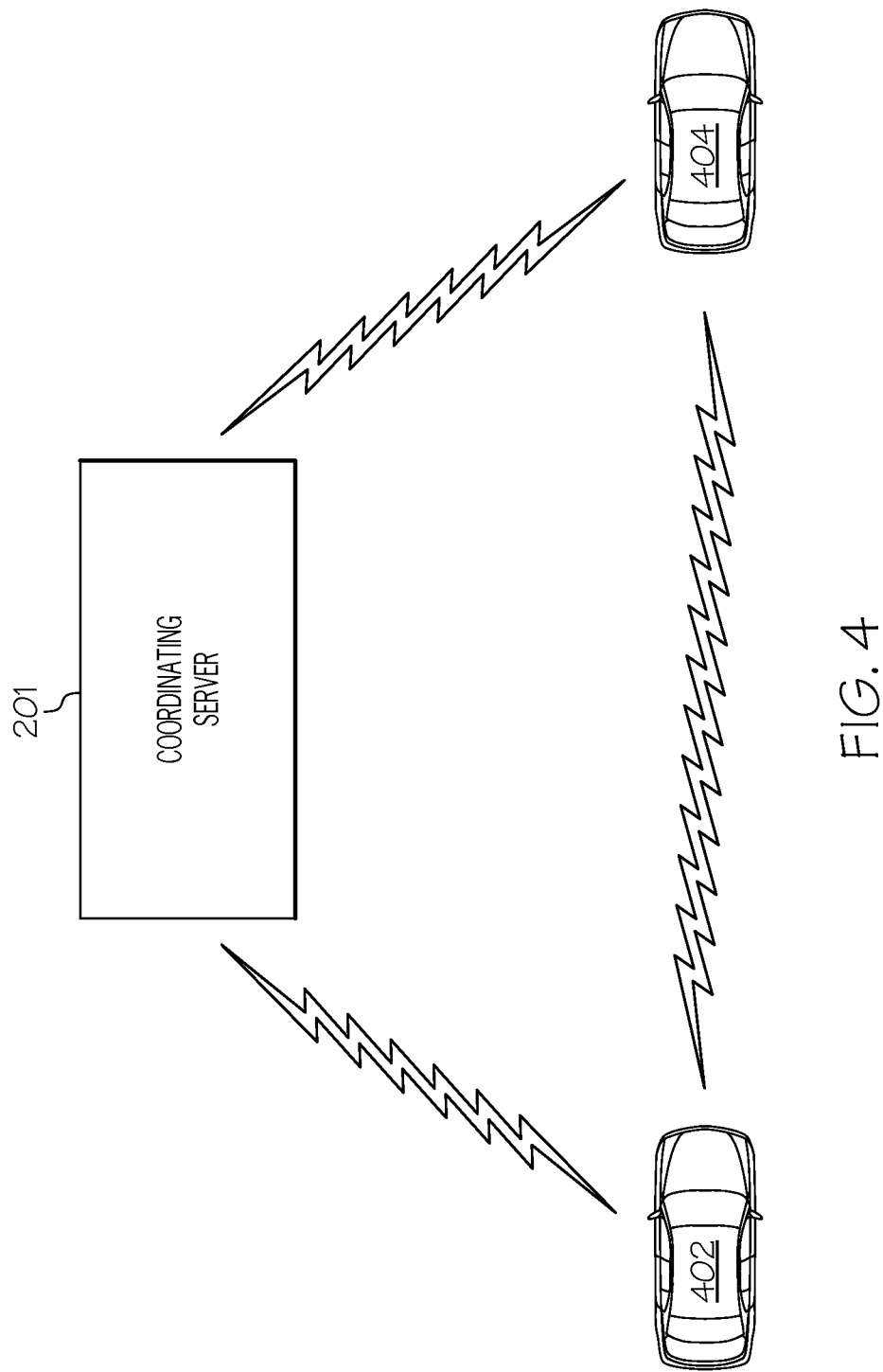
FIG. 4 depicts communication linkages among multiple vehicles capable of operating in an autonomous mode and a coordinating server.

With reference now to FIG. 4, communication linkages among the coordinating server 201 (introduced in FIG. 2) and/or the SDV 402 (analogous to one or more of the SDVs 202a-202h shown in FIG. 2) and/or a vehicle 404 (analogous to one or more of the vehicles 204a-204c shown in FIG. 2) are presented. That is, in one or more embodiments of the present invention, coordinating server 201 is able to communicate with SDV 402 and/or vehicle 404, and SDV 402 is able to directly communicate with vehicle 404, thus allowing SDV 402 to directly control the movement of vehicle 404 (and vice versa) when required.

In embodiment of the present invention, a weighted voting system is used to weight the various variables used in making the decisions regarding how lanes are reserved (i.e., for SDVs in autonomous mode or manual mode). Such inputs may include: a history of accidents on a roadway for SDVs in autonomous mode compared to SDVs on the roadway in manual mode, a level of fuel usage/efficiency of SDVs in autonomous mode compared to SDVs on the roadway in manual mode, etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to adjust the toll charge). The inputs are ($I1, I2, \ldots, IN$), where "N" denotes the total number of inputs. An input's weight (w) is the number of "votes" associated with the input to determine how significant (weighted) the input is. A quota (q) is the minimum number of votes required to "pass a motion", which in this case refers to a decision made to adjust the reservation of a lane from one mode to another (e.g., manual to autonomous), and/or to switch operation of particular vehicles from one mode to another (e.g., manual to autonomous).

In one or more embodiments of the present invention, changing the control mode of a vehicle (e.g., vehicle 204a) depends on a cohort to which a driver of the vehicle 204a belongs, and/or a cohort to which the vehicle 204a belongs.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents with obstacles on toll roads when auto-control is 1) not activated or 2) not available on the vehicle that the person was driving. As such, the system (e.g., coordinating server 201 in FIG. 2) will automatically cause vehicle 204a to switch from manual to autonomous mode.

Similarly, assume that vehicle 204a has characteristics (e.g., make, model, size, etc.) found in other members of a cohort of vehicles. Assume that this characteristic/trait affects the vehicles' ability to respond to emergency situations (such as obstacles in the road) when operating in autonomous mode. Assume further that historical data shows that these cohort members (e.g., particular makes and models of SDVs) have a history of fewer accidents with obstacles on roadways when auto-control is activated. As such, the system (e.g., coordinating server 201 in FIG. 2) will automatically switch the control mode of vehicle 204a from manual mode to autonomous mode.

Figure 5:
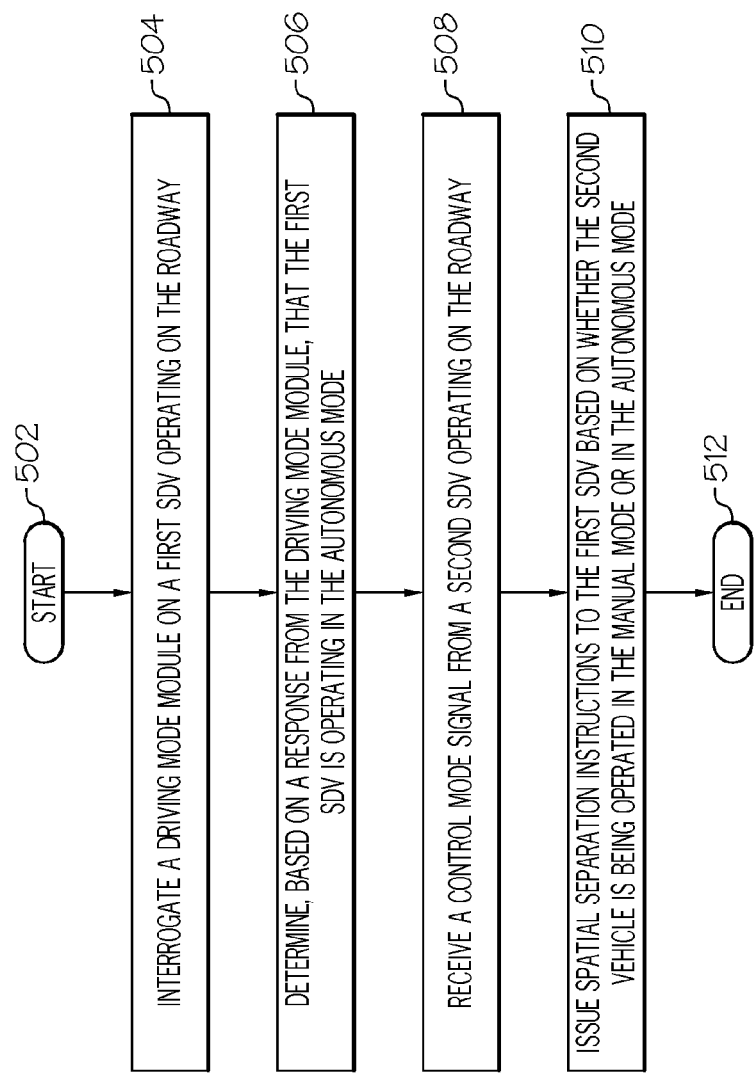
FIG. 5 is a high-level flow chart of one or more steps performed by one or more processors and/or other hardware to automatically provide spatial separation between SDVs operating in autonomous mode and vehicles being operated in manual mode.

With reference now to FIG. 5, a high-level flow chart of one or more steps performed by one or more processors to automatically provide spatial separation between self-driving vehicles (SDVs) operating in an autonomous mode and vehicles being operating in a manual mode on a roadway in accordance with one or more embodiments of the present invention is presented.

After initiator block 502, one or more processors (within coordinating server 201 and/or one or more of the SDVs 202a-202h shown in FIG. 2) interrogate a driving mode module (e.g., driving mode module 307 shown in FIG. 3) on a first SDV (e.g., SDV 202a) operating on the roadway (e.g., roadway 214 shown in FIG. 2), as described in block 504. As described herein, the first SDV is capable of being operated in autonomous mode by a first SDV control mechanisms controller (e.g., SDV control mechanisms controller 303 shown in FIG. 3, which in one embodiment is an electromechanical controller) being controlled by a first SDV on-board computer (e.g., SDV on-board computer 301 shown in FIG. 3) on the first SDV. The first SDV control mechanisms controller controls a first set of SDV vehicular physical control mechanisms (e.g., set of SDV vehicular physical control mechanisms 305 shown in FIG. 3) on the first SDV. The driving mode module selectively controls whether the first SDV is operated in the autonomous mode (i.e., under the control of the SDV on-board computer 301) or in manual mode (i.e., in which a human driver controls the set of SDV vehicular physical control mechanisms 305 either directly using mechanical controls, or indirectly by inputting commands to the SDV control mechanisms controller 303).

As described in block 506, the processor(s) determine, based on a response from the driving mode module, that the first SDV is operating in the autonomous mode.

As described in block 508, the processor(s) receive a control mode signal from a second vehicle operating on the roadway, wherein the control mode signal describes whether a second set of SDV vehicular physical control mechanisms on the second vehicle is being operated in the manual mode by a second human driver of the second SDV or in the autonomous mode by a second SDV control mechanisms controller being controlled by a second SDV on-board computer on the second vehicle. That is, a control mode signal is sent from the driving mode module 307 if the second vehicle has an SDV on-board computer 301 shown in FIG. 3. However, the second vehicle may be an older vehicle that does not have the ability (e.g., does not have an SDV on-board computer 301) to operate in the autonomous mode. In this case, the mere lack of a responsive control mode signal (e.g., a "null" signal) is indicative of the fact that the second vehicle is incapable of operating in the autonomous mode, and thus must be operating in manual mode. Similarly, if the second vehicle does have an SDV on-board computer 301 and other hardware required for autonomous operation, but this computer/hardware is currently inoperable (i.e., "broken"), then the second vehicle is unable to respond with a control mode signal, thus indicating that it has to be controlled in manual mode.

As described in block 510, the processor(s) then issue spatial separation instructions to the first SDV. These spatial separation instructions, which may be generated by the coordinating server 201 shown in FIG. 2 or internally generated by the SDV itself (e.g., using its internal SDV on-board computer 301), direct the first SDV control mechanisms controller to direct the first set of SDV vehicular physical control mechanisms on the first SDV to provide a predetermined amount of spatial separation between the first SDV and the second vehicle based on whether the second vehicle is being operated in the manual mode or in the autonomous mode. That is, if the second vehicle is in manual mode, then the first SDV will give the second vehicle more space (as shown in mixed mode lane 208 in FIG. 2). However, if the second vehicle is operating in autonomous mode (as shown in the autonomous mode lane 206 in FIG. 2), then the two vehicles will travel in close proximity to one another.

Thus, if the second vehicle is being operated in the manual mode, then the processor(s) provide the predetermined amount of spatial separation between the first SDV and the second vehicle by directing the first set of SDV vehicular physical control mechanisms to provide a predefined amount of physical space between the first SDV and the second vehicle (e.g., by slowing the first SDV down, by moving the first SDV into a different lane, etc.).

The flow-chart in FIG. 5 ends at terminator block 512.

In one embodiment of the present invention, the amount of space maintained between vehicles (between autonomous mode SDVs and/or between autonomous mode SDVs and manual mode vehicles) depends on the amount of current or anticipated traffic on the roadway 214 shown in FIG. 2. That is, traffic sensors 253 (radar, physical pressure hoses, etc.) embedded in or adjacent to roadway 214 shown in FIG. 2 are able to detect how many vehicles are on roadway 214 or a specific lane of the roadway 214. Based on these detections, the processor(s) (e.g., within coordinating server 201) then adjust the spatial separation instructions according to the traffic level on the roadway.

For example, if traffic is "light" (e.g., fewer than some predefined number of vehicles are traveling along roadway 214), then there may be little need to encourage vehicles to operate in autonomous mode, since there is plenty of space around vehicles (and thus the chance of stop and go movement, accidents, etc. is low). However, if traffic is "heavy" (e.g., more than some predefined quantity of vehicles are traveling along roadway 214), then the incentive to encourage, if not force, vehicles to operate in autonomous mode increases, since the laminar flow of vehicles is much more efficient in autonomous mode when traffic is heavy, safety is greatly improved in heavy traffic conditions, etc.

While the spatial separation may be provided by giving vehicles more space, particularly in a same lane, in one embodiment of the present invention additional spatial separation is provided by activating additional autonomous mode lanes and moving manual mode vehicles out of them. For example, assume that vehicle 204c in FIG. 2 is operating in manual mode. If the mixed mode lane 208 is converted into another autonomous mode lane by the coordinating server, then the vehicle 204 is directed to move over to the manual mode lane 210. This can be accomplished in accordance with two embodiments of the present invention.

In a first embodiment of the present invention, the processor(s) (e.g., within coordinating server 201) create/provide the predetermined amount of spatial separation between the first SDV and the second vehicle by directing the first set of SDV vehicular physical control mechanisms to steer the first SDV onto the autonomous mode lane (e.g., autonomous mode lane 206 and/or the now autonomous mode lane that was previously mixed mode lane 208). This steering either keeps the first SDV in the autonomous mode lane, or moves it to the autonomous lane (if currently traveling in a manual mode lane). The second vehicle is then moved into the manual mode lane activating the SDV control mechanisms controller within the second vehicle to direct a second set of SDV vehicular physical control mechanisms on the second vehicle to steer the second vehicle onto the manual lane. That is, the coordinating server 201 commandeers the autonomous controllers on the second vehicle, thus temporarily putting the second vehicle in autonomous mode, thus forcing it onto the manual mode lane. Once the second vehicle gets to the manual mode lane, then manual control is returned to the driver by the processors(s) in the coordinating server deactivating the second SDV control mechanisms controller in the second vehicle.

In a second embodiment of the present invention, the processor(s) (e.g., within coordinating server 201) still direct the first set of SDV vehicular physical control mechanisms to steer the first SDV onto the autonomous mode lane (e.g., autonomous mode lane 206 and/or the now autonomous mode lane that was previously mixed mode lane 208). However, now the processor(s) instruct the second vehicle (and more specifically the driver of the second vehicle) to move over to the manual mode lane by electronically displaying, on a display on electronic signage on the roadway (e.g., roadway signage 212 shown in FIG. 2), instructions to the driver of the second vehicle to manually steer the second vehicle onto the manual lane.

In an embodiment of the present invention, one or more processors (e.g., part of coordinating server 201) retrieve traffic pattern data for multiple SDVs traveling on the roadway. The processors examine the traffic pattern data to determine characteristics of a first traffic flow of the multiple SDVs and a second traffic flow of the multiple SDVs. The multiple SDVs in the first traffic flow are operating in the autonomous mode on the roadway, and the multiple SDVs in the second traffic flow are operating in the manual mode on the roadway. In response to determining that the first traffic flow is more efficient than the second traffic flow, the processors then force all vehicles equipped with autonomous control hardware (see FIG. 3) to switch to autonomous mode.

For example, assume that traffic patterns of vehicles are examined according to whether the vehicles are in autonomous mode or manual mode. In one embodiment, the vehicles are segregated into autonomous mode lane 206 (assuming that vehicles are SDVs traveling on autonomous lane 206 in autonomous mode) and manual mode lane 210 (assuming that vehicles traveling on manual lane 214 are doing so in manual mode). In another embodiment, however, there are no dedicated lanes for vehicles in autonomous mode or manual mode. In either embodiment, if an examination of the traffic patterns for vehicles in autonomous/manual mode reveals that vehicles operating in autonomous mode are safer, move with less congestion, are faster, etc., then any vehicle capable of operating in autonomous mode is forced to do so, and additional lanes are converted into autonomous mode lanes to accommodate the greater number of SDVs operating in the autonomous mode.

In an embodiment of the present invention, one or more processors (e.g., components of coordinating server 201) retrieve driver profile information about a driver of the vehicle. This driver is then assigned, by the one or more processors, to a cohort of drivers traveling on the roadway in multiple vehicles, where the driver of the vehicle shares more than a predetermined quantity of traits with members of the cohort of drivers. The one or more processors retrieve traffic pattern data for the multiple vehicles occupied by the cohort of drivers traveling on the roadway. The one or more processors then examine the traffic pattern data to determine a first traffic flow and a second traffic flow. The first traffic flow is of SDVs that are occupied by members of the cohort of drivers while the SDVs are operating in autonomous mode on the roadway, and the second traffic flow is of vehicles that are occupied by members of the cohort of drivers while the vehicles are operating in manual mode on the roadway. In response to determining that the first traffic flow is more efficient than the second traffic flow, then one or more processors forces the vehicles to convert to autonomous/SDV mode, and additional autonomous mode lanes are opened up.

That is, assume that a cohort of drivers is made up of drivers who are not very good drivers (e.g., have many accidents, drive too slowly, cause traffic congestion, etc.). Such drivers are encouraged, if not forced to let the SDV drive itself (in autonomous mode). However, another cohort of drivers may be made up of excellent drivers, who are able to out-perform the on-board SDV control mechanisms controller 303 shown in FIG. 3. If a particular driver fits into this cohort, then he/she is allowed to continue driving his/her vehicle in the manual mode of operation.

The determination of whether a particular cohort of drivers (and thus each member thereof) is better than or worse than the on-board SDV control mechanisms controller at controlling the SDV is history-based. That is, the processors examine the driving history of "poor" drivers and "excellent" drivers while their occupied vehicle/SDV is in both manual mode and autonomous mode. "Poor" drivers are those who are unable to operate the vehicle/SDV as well as the on-board SDV control mechanisms controller, and "excellent" drivers are those who are able to operate the vehicle/SDV better than the on-board SDV control mechanisms controller.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
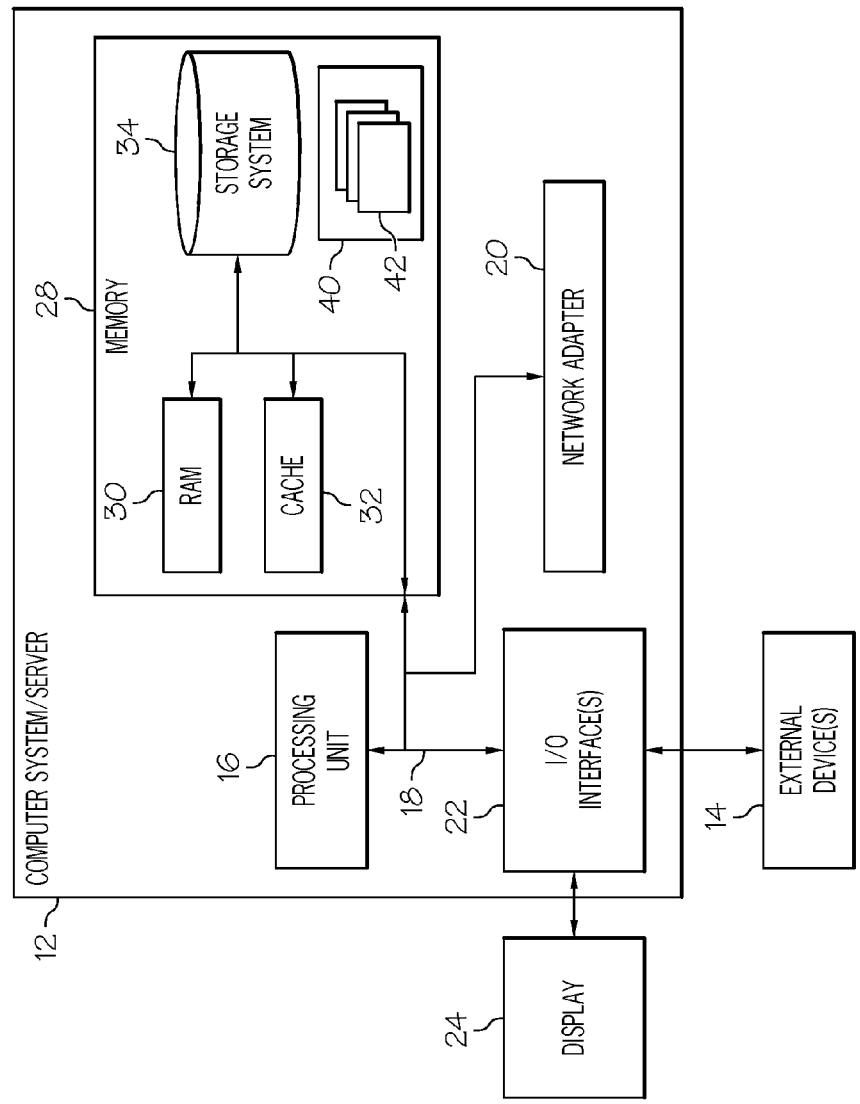
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
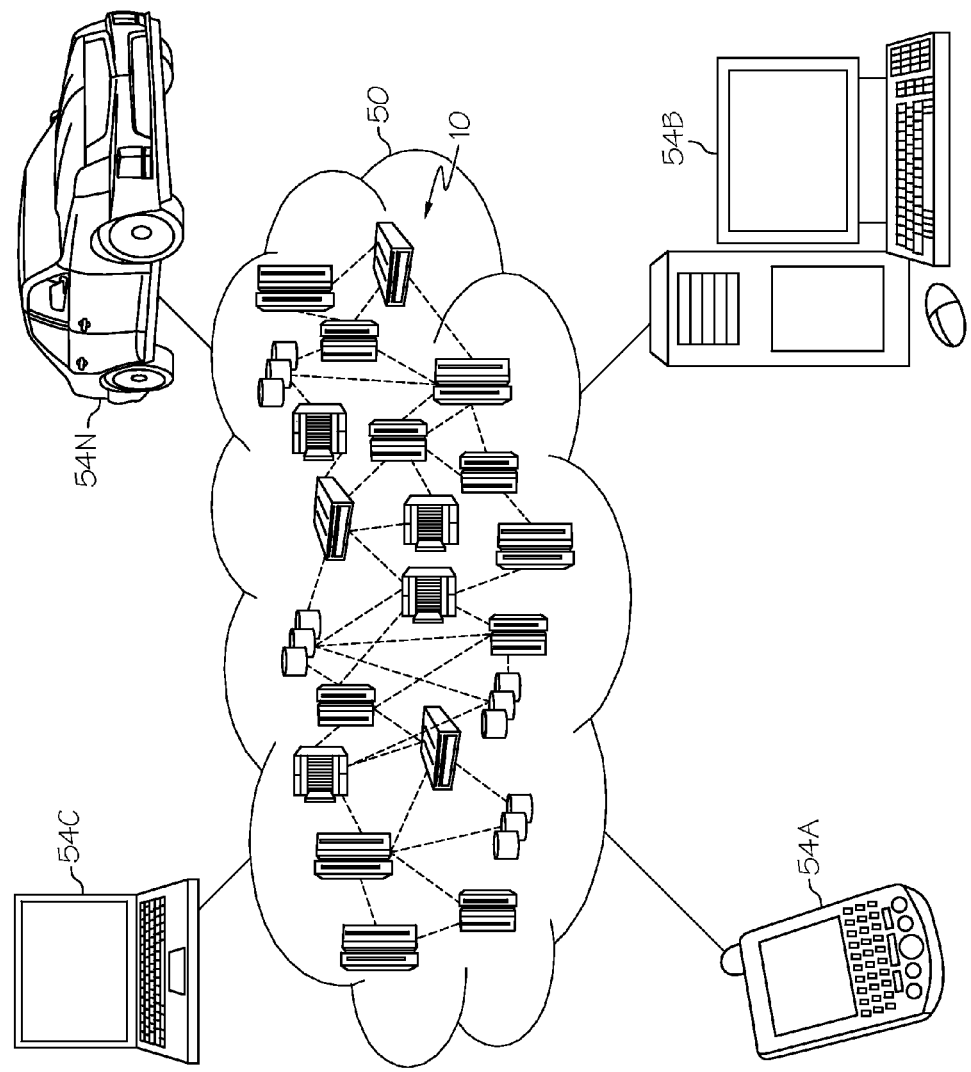
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
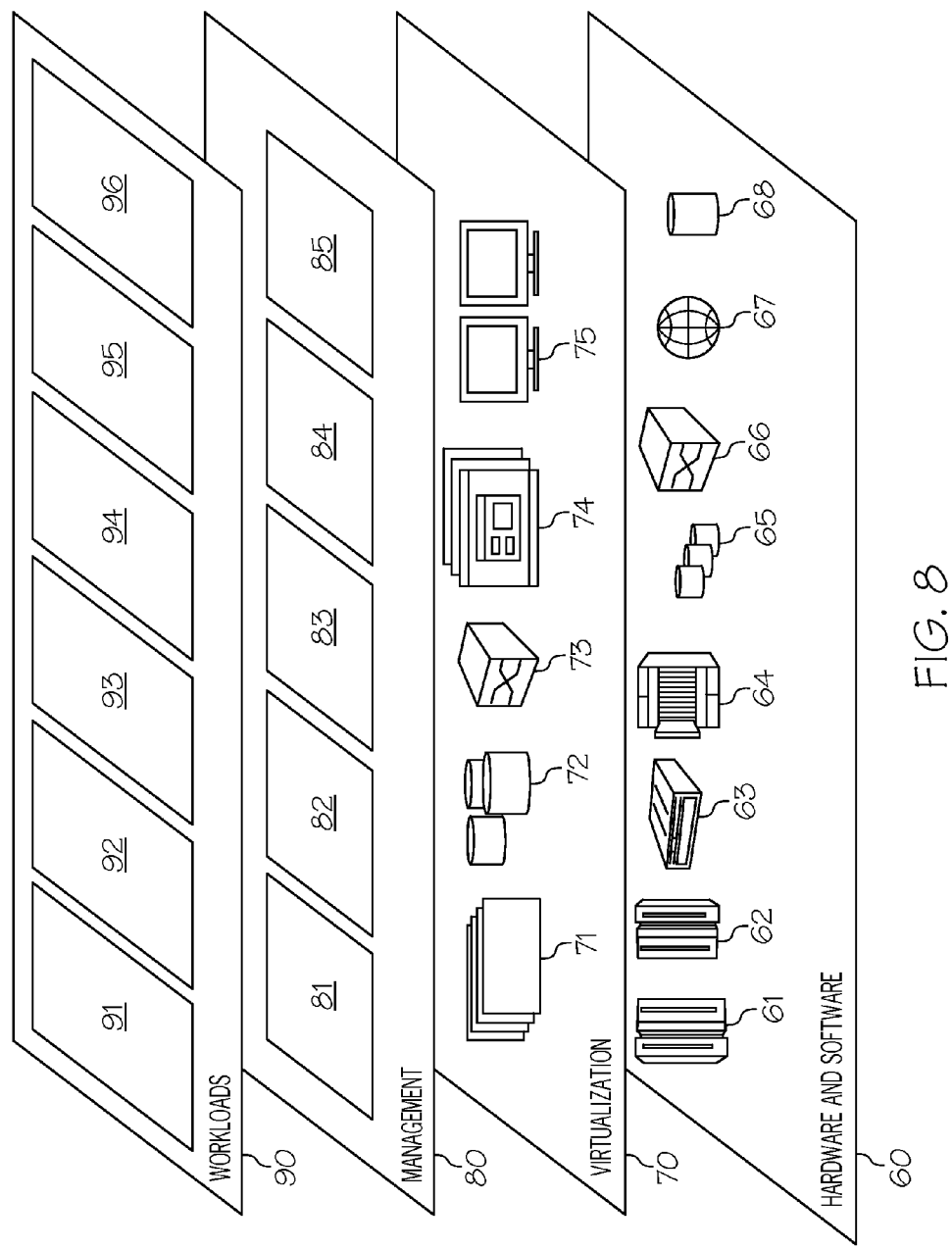
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for controlling spatial distances between vehicles as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for automatically providing spatial separation between self-driving vehicles (SDVs) operating in an autonomous mode and vehicles being operating in a manual mode on a roadway, the computer-implemented method comprising:
    interrogating, by one or more processors, a driving mode module on a first SDV operating on the roadway, wherein the first SDV is capable of being operated in autonomous mode by a first SDV control mechanisms controller being controlled by a first SDV on-board computer on the first SDV, wherein the first SDV control mechanisms controller controls a first set of SDV vehicular physical control mechanisms on the first SDV, wherein the driving mode module selectively controls whether the first SDV is operated in the autonomous mode or in manual mode, and wherein the first SDV is controlled by a first human driver of the first SDV if the first SDV is in the manual mode;
    determining, by the one or more processors and based on a response from the driving mode module, that the first SDV is operating in the autonomous mode;
    receiving, by one or more processors, a control mode signal from a second vehicle operating on the roadway, wherein the control mode signal describes whether a second set of SDV vehicular physical control mechanisms on the second vehicle is being operated in the manual mode by a second human driver of the second vehicle or in the autonomous mode by a second SDV control mechanisms controller being controlled by a second SDV on-board computer on the second vehicle; and
    issuing, by one or more processors, spatial separation instructions to the first SDV, wherein the spatial separation instructions direct the first SDV control mechanisms controller to direct the first set of SDV vehicular physical control mechanisms on the first SDV to provide a predetermined amount of spatial separation between the first SDV and the second vehicle based on whether the second vehicle is being operated in the manual mode or in the autonomous mode.

2. The computer-implemented method of claim 1, further comprising:
    detecting, by traffic sensors, a traffic level on the roadway; and
    adjusting, by one or more processors, the spatial separation instructions according to the traffic level on the roadway.

3. The computer-implemented method of claim 1, wherein the second SDV control mechanisms controller and the second SDV on-board computer are inoperable on the second vehicle, and wherein the control mode signal from the second vehicle is a null signal.

4. The computer-implemented method of claim 1, wherein the second SDV control mechanisms controller and the second SDV on-board computer are absent from the second vehicle, and wherein the control mode signal from the second vehicle is a null signal.

5. The computer-implemented method of claim 1, wherein the second vehicle is being operated in the manual mode, and wherein the computer-implemented method further comprises:
    providing, by one or more processors, the predetermined amount of spatial separation between the first SDV and the second vehicle by directing the first set of SDV vehicular physical control mechanisms to provide a predefined amount of physical space between the first SDV and the second vehicle.

6. The computer-implemented method of claim 1, wherein the second vehicle is being operated in the manual mode, wherein the roadway comprises an autonomous lane reserved for autonomously-controlled vehicles and a manual lane reserved for vehicles being operated in the manual mode, and wherein the computer-implemented method further comprises:
    providing, by one or more processors, the predetermined amount of spatial separation between the first SDV and the second vehicle by directing the first set of SDV vehicular physical control mechanisms to steer the first SDV onto the autonomous lane and by activating the second SDV control mechanisms controller to direct a second set of SDV vehicular physical control mechanisms on the second vehicle to steer the second vehicle onto the manual lane; and
    in response to the second vehicle reaching the manual lane, deactivating, by one or more processors, the second SDV control mechanisms controller in the second vehicle.

7. The computer-implemented method of claim 1, wherein the second vehicle is being operated in the manual mode, wherein the roadway comprises an autonomous lane reserved for autonomously-controlled vehicles and a manual lane reserved for vehicles being operated in the manual mode, and wherein the computer-implemented method further comprises:
    directing, by one or more processors, the first set of SDV vehicular physical control mechanisms to steer the first SDV onto the autonomous lane; and
    electronically displaying, by one or more processors that control a display on electronic signage on the roadway, instructions to the driver of the second vehicle to manually steer the second vehicle onto the manual lane.

8. A computer program product for automatically providing spatial separation between self-driving vehicles (SDVs) operating in an autonomous mode and vehicles being operating in a manual mode on a roadway, the computer program product comprising a non-transitory computer readable storage medium having program code embodied therewith, the program code readable and executable by a processor to perform a method comprising:
    interrogating a driving mode module on a first SDV operating on the roadway, wherein the first SDV is capable of being operated in autonomous mode by a first SDV control mechanisms controller being controlled by a first SDV on-board computer on the first SDV, wherein the first SDV control mechanisms controller controls a first set of SDV vehicular physical control mechanisms on the first SDV, wherein the driving mode module selectively controls whether the first SDV is operated in the autonomous mode or in manual mode, and wherein the first SDV is controlled by a first human driver of the first SDV if the first SDV is in the manual mode;
    determining, based on a response from the driving mode module, that the first SDV is operating in the autonomous mode;
    receiving a control mode signal from a second vehicle operating on the roadway, wherein the control mode signal describes whether a second set of SDV vehicular physical control mechanisms on the second vehicle is being operated in the manual mode by a second human driver of the second vehicle or in the autonomous mode by a second SDV control mechanisms controller being controlled by a second SDV on-board computer on the second vehicle; and issuing spatial separation instructions to the first SDV, wherein the spatial separation instructions direct the first SDV control mechanisms controller to direct the first set of SDV vehicular physical control mechanisms on the first SDV to provide a predetermined amount of spatial separation between the first SDV and the second vehicle based on whether the second vehicle is being operated in the manual mode or in the autonomous mode.

9. The computer program product of claim 8, wherein the method further comprises:

detecting, using signals from traffic sensors, a traffic level on the roadway; and adjusting the spatial separation instructions according to the traffic level on the roadway.

10. The computer program product of claim 8, wherein the second SDV control mechanisms controller and the second SDV on-board computer are inoperable on the second vehicle, and wherein the control mode signal from the second vehicle is a null signal.

11. The computer program product of claim 8, wherein the second SDV control mechanisms controller and the second SDV on-board computer are absent from the second vehicle, and wherein the control mode signal from the second vehicle is a null signal.

12. The computer program product of claim 8, wherein the second vehicle is being operated in the manual mode, and wherein the method further comprises:

providing the predetermined amount of spatial separation between the first SDV and the second vehicle by directing the first set of SDV vehicular physical control mechanisms to provide a predefined amount of physical space between the first SDV and the second vehicle.

13. The computer program product of claim 8, wherein the second vehicle is being operated in the manual mode, wherein the roadway comprises an autonomous lane reserved for autonomously-controlled vehicles and a manual lane reserved for vehicles being operated in the manual mode, and wherein the method further comprises:

providing the predetermined amount of spatial separation between the first SDV and the second vehicle by directing the first set of SDV vehicular physical control mechanisms to steer the first SDV onto the autonomous lane and by activating the second SDV control mechanisms controller to direct a second set of SDV vehicular physical control mechanisms on the second vehicle to steer the second vehicle onto the manual lane; and in response to the second vehicle reaching the manual lane, deactivating the second SDV control mechanisms controller in the second vehicle.

14. The computer program product of claim 8, wherein the second vehicle is being operated in the manual mode, wherein the roadway comprises an autonomous lane reserved for autonomously-controlled vehicles and a manual lane reserved for vehicles being operated in the manual mode, and wherein the method further comprises:

directing the first set of SDV vehicular physical control mechanisms to steer the first SDV onto the autonomous lane; and electronically displaying, on electronic signage on the roadway, instructions to the driver of the second vehicle to manually steer the second vehicle onto the manual lane.

15. A computer system comprising:

a processor, a computer readable memory, and a non-transitory computer readable storage medium;

first program instructions to interrogate a driving mode module on a first SDV operating on a roadway, wherein the first SDV is capable of being operated in autonomous mode by a first SDV control mechanisms controller being controlled by a first SDV on-board computer on the first SDV, wherein the first SDV control mechanisms controller controls a first set of SDV vehicular physical control mechanisms on the first SDV, wherein the driving mode module selectively controls whether the first SDV is operated in the autonomous mode or in manual mode, and wherein the first SDV is controlled by a first human driver of the first SDV if the first SDV is in the manual mode;

second program instructions to determine, based on a response from the driving mode module, that the first SDV is operating in the autonomous mode;

third program instructions to receive a control mode signal from a second vehicle operating on the roadway, wherein the control mode signal describes whether a second set of SDV vehicular physical control mechanisms on the second vehicle is being operated in the manual mode by a second human driver of the second vehicle or in the autonomous mode by a second SDV control mechanisms controller being controlled by a second SDV on-board computer on the second vehicle; and fourth program instructions to issue spatial separation instructions to the first SDV, wherein the spatial separation instructions direct the first SDV control mechanisms controller to direct the first set of SDV vehicular physical control mechanisms on the first SDV to provide a predetermined amount of spatial separation between the first SDV and the second vehicle based on whether the second vehicle is being operated in the manual mode or in the autonomous mode; and wherein the first, second, third, and fourth program instructions are stored on the non-transitory computer readable storage medium for execution by one or more processors via the computer readable memory.

16. The computer system of claim 15, further comprising:

fifth program instructions to detect, via signals from traffic sensors, a traffic level on the roadway; and sixth program instructions to adjust the spatial separation instructions according to the traffic level on the roadway; and wherein the fifth and sixth program instructions are stored on the non-transitory computer readable storage medium for execution by one or more processors via the computer readable memory.

17. The computer system of claim 15, wherein the second SDV control mechanisms controller and the second SDV on-board computer are absent from the second vehicle, and wherein the control mode signal from the second vehicle is a null signal.

18. The computer system of claim 15, wherein the second vehicle is being operated in the manual mode, and wherein the computer system further comprises:

fifth program instructions to provide the predetermined amount of spatial separation between the first SDV and the second vehicle by directing the first set of SDV vehicular physical control mechanisms to provide a predefined amount of physical space between the first SDV and the second vehicle; and wherein the fifth program instructions are stored on the non-transitory computer readable storage medium for execution by one or more processors via the computer readable memory.

19. The computer system of claim 15, wherein the second vehicle is being operated in the manual mode, wherein the roadway comprises an autonomous lane reserved for autonomously-controlled vehicles and a manual lane reserved for vehicles being operated in the manual mode, and wherein the computer system further comprises:
fifth program instructions to provide the predetermined amount of spatial separation between the first SDV and the second vehicle by directing the first set of SDV vehicular physical control mechanisms to steer the first SDV onto the autonomous lane and by activating the second SDV control mechanisms controller to direct a second set of SDV vehicular physical control mechanisms on the second vehicle to steer the second vehicle onto the manual lane; and
sixth program instructions to, in response to the second vehicle reaching the manual lane, deactivate the second SDV control mechanisms controller in the second vehicle; and wherein the fifth and sixth program instructions are stored on the non-transitory computer readable storage medium for execution by one or more processors via the computer readable memory.

20. The computer system of claim 15, wherein the second vehicle is being operated in the manual mode, wherein the roadway comprises an autonomous lane reserved for autonomously-controlled vehicles and a manual lane reserved for vehicles being operated in the manual mode, and wherein the computer system further comprises:
fifth program instructions to direct the first set of SDV vehicular physical control mechanisms to steer the first SDV onto the autonomous lane; and
sixth program instructions to electronically display, on electronic signage on the roadway, instructions to the driver of the second vehicle to manually steer the second vehicle onto the manual lane; and wherein
the fifth and sixth program instructions are stored on the non-transitory computer readable storage medium for execution by one or more processors via the computer readable memory.

* * * * *